(12) United States Patent
Hock

(10) Patent No.: US 6,411,572 B1  
(45) Date of Patent: Jun. 25, 2002

(54) METHOD AND APPARATUS FOR EFFICIENT MEASUREMENT OF OPTICAL PICKUP SLED MECHANISM PARAMETERS

(75) Inventor: Kai Meng Hock, Singapore (SG)

(73) Assignee: Sony Precision Engineering Center (Singapore) PTE Ltd., Singapore (SG)

( * ) Notice: Subject to any disclaimer, the term of this patent is extended or adjusted under 35 U.S.C. 154(b) by 0 days.

(21) Appl. No.: 09/564,620

(22) Filed: May 4, 2000

(30) Foreign Application Priority Data

May 7, 1999 (SG) ............................................. 9902095

(51) Int. Cl.$^7$ ............................................. G11B 17/22
(52) U.S. Cl. ................... 369/32; 369/44.28; 388/821; 318/375
(58) Field of Search ................... 369/32, 44.28, 369/44.27, 44.32, 13.17, 124.01, 44.31; 388/815, 822, 910, 677, 632, 821, 906, 928.1; 360/75, 78.04, 105; 318/375, 380, 459

(56) References Cited

U.S. PATENT DOCUMENTS

| | | | | |
|---|---|---|---|---|
| 4,510,423 A | * | 4/1985 | Iwasawa | 388/821 |
| 5,729,399 A | * | 3/1998 | Albrecht et al. | 360/75 |
| 5,757,747 A | | 5/1998 | Shimada | 369/44.28 |
| 5,818,184 A | * | 10/1998 | Kim | 318/375 |
| 6,011,902 A | * | 1/2000 | Yamamoto | 388/815 |

FOREIGN PATENT DOCUMENTS

| | | |
|---|---|---|
| EP | 0 408 392 | 1/1991 |
| EP | 0 650 160 | 4/1995 |

\* cited by examiner

*Primary Examiner*—Ali Neyzari  
(74) *Attorney, Agent, or Firm*—Frommer Lawrence & Haug LLP; William S. Frommer; Bruno Polito (57) ABSTRACT

A motor constant $K_m$ of a sled mechanism of an optical disc drive is to be measured. To this end, a parameter measurement device 1 for the sled mechanism includes an oscilloscope 8 for detecting the back-electromotive force $E_b$ of a sled motor 5, a laser Doppler meter 7 for detecting the movement velocity $v_0$ of the pickup 4 and a computer 9. The computer calculates an equation $E_b = K_m R_m v_0$, where $R_m$ is the resistance of a motor, to find the motor constant $K_m$.

10 Claims, 3 Drawing Sheets

METHOD AND APPARATUS FOR EFFICIENT MEASUREMENT OF OPTICAL PICKUP SLED MECHANISM PARAMETERS

BACKGROUND OF THE INVENTION

1. Field of the Invention

This invention relates to a device for measuring parameters of a sled mechanism of an optical disc drive.

2. Description of the Related Art

An optical disc drive for driving an optical disc, such as a compact disc (CD), a CD-ROM or a DVD, includes an optical pickup, referred to below as OP, and an electrical controller for controlling the movement of an objective lens provided in the OP, and is configured for correctly illuminating the laser light emitted from the OP on a track on the optical disc. With such OP, since it is necessary to set mechanical and electro-optical parameters required for stable tracking and track jump under many different conditions, a lot of time and labor are required in newly studying and testing an OP.

It is therefore contemplated to effect computer simulation for an OP to study and test the OP.

For such computer simulation for an OP, parameters of a sled mechanism for causing radial movement of a main body unit of the OP along the radius of the optical disc are required.

Such sled mechanism generally includes a shaft provided radially of the optical disc, a sled motor for driving the OP provided on the shaft and plural gears for transmitting the sled motor rotation to the OP.

However, it is extremely difficult to find a motor constant Km, a viscosity coefficient $\gamma$ and a Coulomb friction $F_c$ in the sled mechanism, such that these parameters cannot be reflected in the Op simulation. The result is that the Op simulation on the computer cannot be accurate.

SUMMARY OF THE INVENTION

It is therefore an object of the present invention to provide a method and apparatus for finding a motor constant Km, a viscosity coefficient $\gamma$ and a Coulomb friction $F_c$ in a sled mechanism for an optical disc drive.

In one aspect, the present invention provides a parameter measurement device for a sled mechanism of an optical disc drive including means for detecting the back-electromotive force of a sled motor, means for detecting the velocity of the movement velocity of an optical pickup, means for causing movement of the optical pickup and means for calculating a motor constant of the sled mechanism based on the back-electromotive force of the sled motor and on the movement velocity of the optical pickup when the movement means causes the movement of the optical pickup.

In the present parameter measurement device for a sled mechanism, the calculating means finds the motor constant Km based on $E_b = K_m R_m v_0$, where $E_b$ is the back-electromotive force of the sled motor when the movement means causes the movement of the optical pickup, $v_0$ is the movement velocity of the optical pickup when the movement means causes the movement of the optical pickup and Rm is the resistance of the sled motor.

In another aspect, the present invention provides a parameter measurement device for a sled mechanism of an optical disc drive including means for supplying a rectangular electrical voltage of a voltage magnitude $V_m$ and the time t1 to a sled motor, means for detecting the maximum velocity $v_0$ of the pickup when the rectangular electrical voltage is supplied to the sled motor, the deceleration time $t_3$ of the optical pickup, and the distance $x_3$ traversed by the optical pickup during deceleration thereof, and means for calculating the viscous coefficient and/or the Coulomb coefficient of the sled mechanism of the optical disc drive based on the voltage magnitude $V_m$, the above time $t_1$, maximum velocity of the pickup $v_0$, deceleration time $t_3$ of the optical pickup, the distance $x_3$ traversed by the optical pickup during deceleration thereof and the motor constant Km.

In the present parameter measurement device for the sled mechanism, $\gamma'$ and $F'_c$ are found using $$F'c = 2\gamma' v_0 / [\exp(-2\gamma' t_3) - 1] \qquad (A)$$

and $$F'_c = (v_0 - 2x_3 \gamma')/t_3 \qquad (B)$$

while the mass m of the sled mechanism in its entirety is found using $$m = K_m / [(v_0/t_1 + F'c + \gamma' v_0)/(V_m - K_m R_m v_0/2)] \qquad (C)$$

and the mass m, $\gamma'$ and F'cthus found are substituted into $$F_c = mF'_c \qquad (D)$$

and $$\gamma = m\gamma' \qquad (E)$$

to find the viscosity coefficient $\gamma$ and the Coulomb friction Fc.

In still another aspect, the present invention provides a method for detecting parameters in a sled mechanism of an optical disc drive, including causing movement of an optical pickup, detecting the back-electromotive force of a sled motor and the movement velocity of the optical pickup on causing movement of the optical pickup, and finding the motor constant of the sled mechanism based on the detected back-electromotive force of the sled motor and the detected movement velocity of the optical pickup.

In the present method, the motor constant $K_m$ of a sled motor is found based on $E_b = K_m R_m v_0$, where $E_b$ is the back-electromotive force of the led motor on causing movement of the optical pickup, $v_0$ is the movement velocity of the optical pickup on causing movement of the optical pickup, and Rm is the resistance of the sled motor.

In yet another aspect, the present invention provides a method for detecting parameters in a sled mechanism of an optical disc drive including the steps of supplying a rectangular electrical voltage of a voltage magnitude $V_m$ and the time $t_1$ to a sled motor, detecting the maximum velocity $v_0$ of the pickup when the rectangular electrical voltage is supplied to the sled motor, the deceleration time $t_3$ of the optical pickup, and the distance $x_3$ traversed by the optical pickup during deceleration thereof; and calculating the viscous coefficient and/or the Coulomb coefficient of the sled mechanism based on the voltage magnitude $V_m$, the above time $t_1$, maximum velocity of the pickup $v_0$, deceleration time $t_3$ of the optical pickup, the distance $x_3$ traversed by the optical pickup during deceleration thereof and the motor constant $K_m$.

In the present method, $\gamma'$ and F'care found using $$F'c = 2\gamma' v_0 / [\exp(-2\gamma' t_3) - 1] \qquad (A)$$

and $$F'c = (v_0 - 2x_3\gamma')/t_3 \quad (B)$$

while the mass m of the sled mechanism in its entirety is found using $$m = K_m/[(v_0/t_1 + F'c + \gamma'v_0)/(V_m - K_m R_m v_0/2)] \quad (C)$$

and the mass m, $\gamma'$ and F'cthus found are substituted into $$Fc = mF'c \quad (D)$$

and $$\gamma = m\gamma' \quad (E)$$

to find the viscosity coefficient $\gamma$ and the Coulomb friction Fc.

With the parameter measurement method and device of the present invention, the motor constant Km, viscous coefficient $\gamma$ and the Coulomb friction Fc in the sled mechanism of the optical disc drive can be measured accurately.

DESCRIPTION OF THE PREFERRED EMBODIMENTS

Referring to the drawings, preferred embodiments of the present invention will be explained in detail.

First, a device for measuring parameters for a sled mechanism of the first embodiment of the present invention is explained.

The sled mechanism is used for an optical pickup drive for causing movement of the optical pickup radially of the optical disc. The parameter measurement device for the sled mechanism according to this first embodiment measures the motor constant Km of the sled mechanism configured for causing movement of the optical pickup radially of the optical disc.

Figure 1:
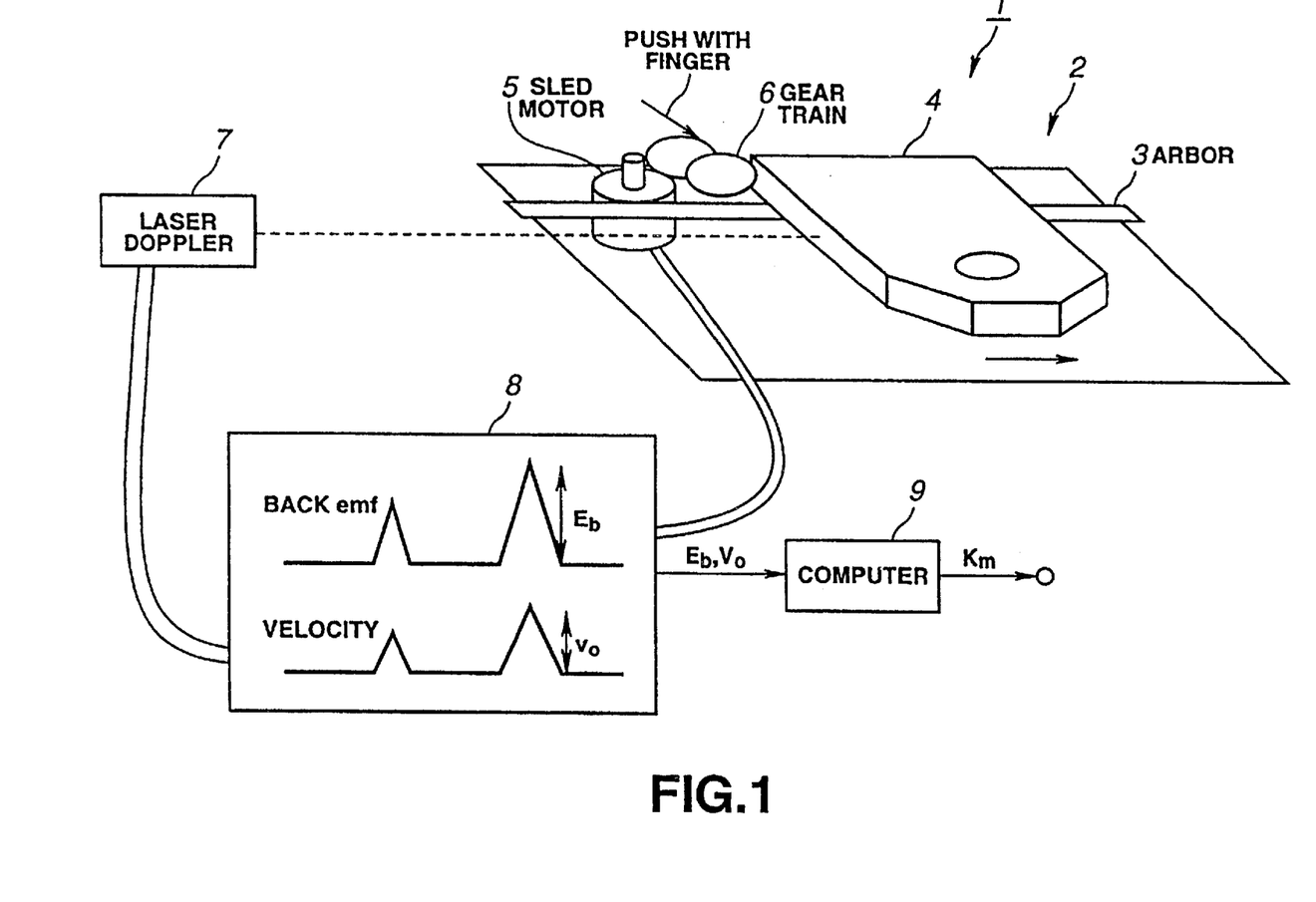
FIG. 1 shows a device for measuring parameters of a sled mechanism according to a first embodiment of the present invention.

FIG. 1 shows the configuration of a parameter measurement device for a sled mechanism 2 according to a first embodiment of the present invention.

A sled mechanism 2, as an object of measurement by the parameter measurement device 1, includes an arbor 3, mounted radially of the optical disc, a pickup 4 moved linearly on this arbor 2, a sled motor 5 for causing linear movement of the pickup 4, and a gear train 6 for transmitting the rotational movement of the sled motor 5 to the pickup 4.

If, in this a sled mechanism 2, the sled motor 5 is run in rotation, the motor power is transmitted through the gear train 6 to the pickup 4, which then performs linear movement on the arbor 3 responsive to the transmitted power.

The parameter measurement device 1, configured for measuring the parameters of the a sled mechanism 2, includes a laser Doppler meter 7 for detecting the velocity of the linear movement of the pickup 4, an oscilloscope 8 for detecting the linear movement velocity as detected by the laser Doppler meter 7 and the back-electromotive force of the sled motor 5, and a computer 9 for computing a motor constant Km of the sled mechanism 2 based on the results of detection by the oscilloscope 8.

The parameter measurement device 1 for the sled mechanism measures the motor constant Km in the following manner.

With no voltage applied across the sled motor 5, the pickup 4 is forced into linear movement, such as by rotating the gear train 6 with finger end or by a separate driving system, not shown. The velocity of linear movement of the pickup 4 at this time is measured by the laser Doppler meter 7, at the same time as the back-electromotive force of the sled motor 5 generated due to the movement of the pickup 4 is measured with the oscilloscope 8.

The back-electromotive force of the sled motor 5 detected at this time is $E_b$, with the velocity of the pickup 4 being $v_0$.

The computer 9 computes the motor constant Km from $E_b$ and $v_0$. Specifically, the motor constant Km is found by the following equation (*)

$$E_b = K_m R_m v_s$$

where $E_b$ = back-electromotive force of the motor;

$R_m$ = motor resistance; and $v_s$ = sled velocity (pickup movement velocity).

The sled motor resistance $R_m$ can be found by measuring the resistance value of the sled motor 5 at the outset.

With the parameter measurement device 1 for the sled mechanism, the motor constant $K_m$ in the sled mechanism of the optical disc drive can be found as described above, so that the motor constant Km can be reflected in pickup simulation.

The laser Doppler meter 7 can be replaced by other devices that can detect the movement velocity of the pickup 4. Although the velocity of the pickup 4 can desirably be detected in a non-contact system, the contact system may also be used if it has only negligible effects on the pickup movement.

The proof for the above equation (*), used for finding the motor constant Km, is as follows:

The movement of the sled mechanism in the optical disc system is now scrutinized from phenomenal aspects.

First, in the sled mechanism, if the sled motor is run in rotation, a voltage $V_m$ is produced from the sled motor. For example, if a manual force is applied to the sled motor, such as with a finger, a voltage $V_m$ is generated from the sled motor.

Second, the sled mechanism has inertia.

Third, the sled mechanism has viscosity and the Coulomb friction.

Fourth, in the sled mechanism, rotational movement by the sled motor and linear pickup movement are performed, with the change of the movement directions being performed by a gear.

Based on the above phenomenal considerations, the following can be postulated in connection with the movement of the sled mechanism:

(a) in the absence of friction, the pickup acceleration is proportionate to the force of the sled motor;

(b) for a constant intensity of the supplied current, the power of the sled motor is proportionate to the voltage applied to the sled motor; and (c) the viscous friction is proportionate to the pickup velocity.

From the above hypotheses (a) to (c), if the sled position (pickup movement position) for the current Im supplied to the sled motor is $X_s$, the constant $K_m$ is given from the Newton's second law indicated by the following equation (**):

$$m\frac{d^2x_s}{dt^2} = k_m R_m I_m - 2\gamma\frac{dx_s}{dt} - F_c \quad (**)$$

where m=mass of the entire sled mechanism;

$K_m V_m = K_m R_m$=power of the sled motor, with $I_m$ and $R_m$ being the sled motor current and the resistance of the sled motor, respectively;

$2\gamma v_s$=viscous friction of the entire sled mechanism; and $F_s$=Coulomb friction of the entire sled mechanism.

Figure 2:
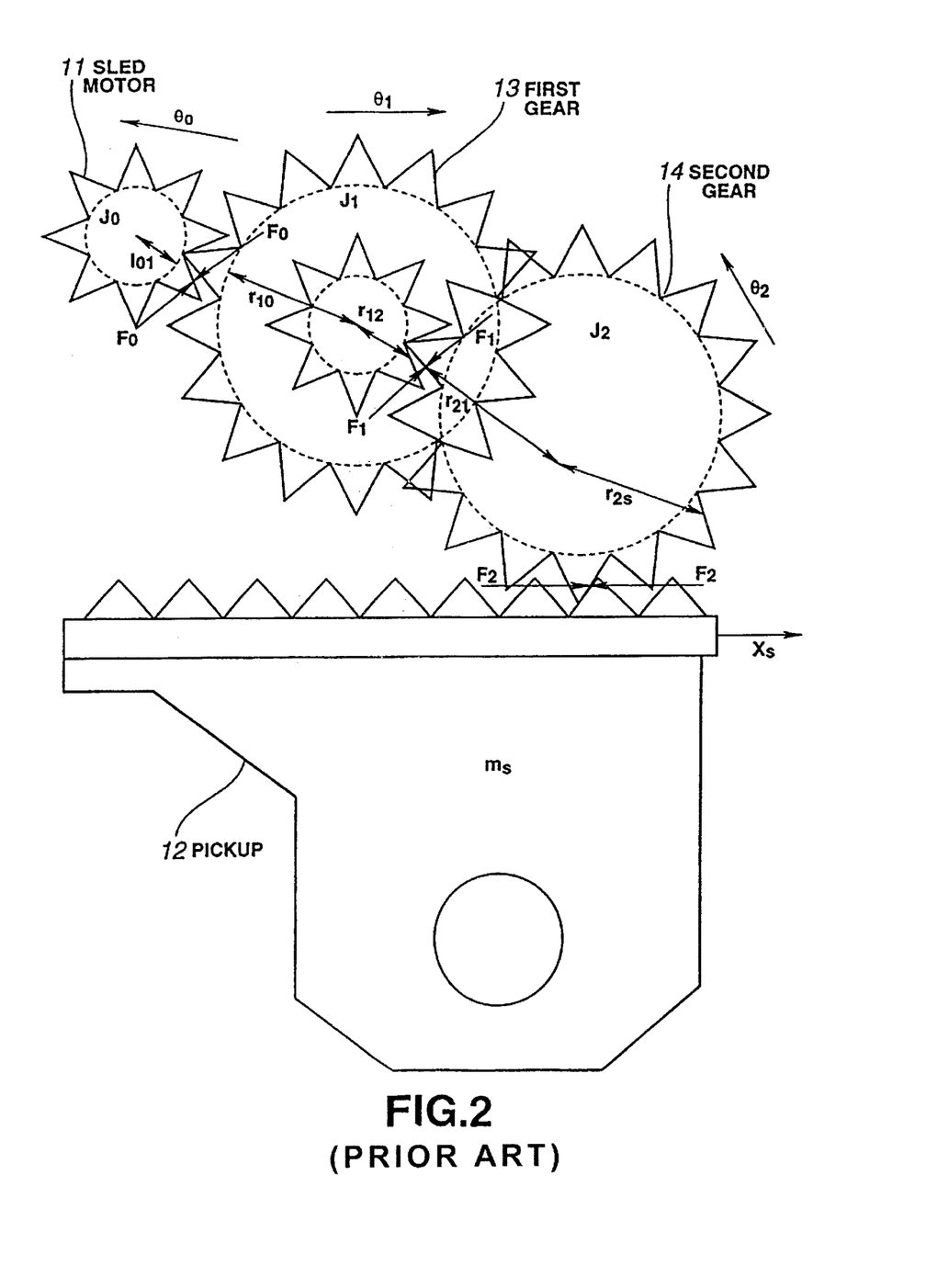
FIG. 2 illustrates a typical sled mechanism.

Based on this equation (**), proof is now given as follows:

It is noted that a model of the sled mechanism shown in FIG. 2 is used for the proof. The model for the sled mechanism, shown in FIG. 2, includes a sled motor 11, having a gear on its rotary shaft, a pickup 12 having a rack gear to enable linear movement, a first gear 13 provided for meshing with the sled motor, and a second gear 14 provided for meshing with the pickup 12. With this model of the sled mechanism, the first gear 13 meshes with the second gear 14. Therefore, with this model of the sled mechanism, the rotational force of the sled motor 11 is transmitted to the pickup 12 to cause linear movement of the pickup 12.

It is first shown that the motor constant is equal to the back-electromotive force constant.

Let $I_m$=motor constant, $T_m$=motor torque. Then, $$T_m = K_0 I_m \quad (1)$$

where $K_0$ is a motor constant.

Then let ωm=motor angular velocity and $E_b$=back-electromotive force. Then, $$E_b = K_1 \omega_m \quad (2)$$

where $K_1$=back-electromotive force constant.

The motor resistance of the sled motor 11 under a stable rotational state and non-rotational state is assumed to be $R_m$.

Then, the work done against friction during one complete revolution is expressed by the following equation (3):

$$\text{work done against friction} = K_0 I_m \times 2\pi \quad (3)$$

while the work done against the back-electromotive force during one complete revolution is expressed by the following equation (4):

$$\text{work done against the back-electromotive force} = E_b I_m \bar{\ } \times t = K_1 \omega_m \phi_m \times 2\pi/\omega_m = K_1 I_m \times 2\pi \quad (4).$$

From the law of energy conservation and Lenz's law, the motor constant coincides with the back-electromotive force constant, as indicated by the following equation (5):

$$K_0 = K_1 \quad (5).$$

The relation between the motion of the pickup 12 and the sled motor current of the sled motor 11 is now shown.

First, an equation of motion for the sled motor 11, pickup 12, first gear 13 and the second gear 14 is set.

The equation of motion (6) for the sled motor is:

$$J_o \frac{d^2\theta_0}{dt^2} = K_0 I_m - F_0 r_{01} - 2\gamma_0 \frac{d\theta_o}{dt} - R_0 \quad (6)$$

where $J_0$=motor moment of inertia $\theta_0$=angle of motor $\gamma_0$=viscous torque coefficient $R_0$=Coulomb torque friction $F_0$=reaction from first gear on the motor $r_{01}$=distance from the center of the motor of the first gear.

The equation of motion (7) of the first gear 13 is:

$$J_1 \frac{d^2\theta_1}{dt^2} = F_0 r_{10} - F_1 r_{12} - 2\gamma_1 \frac{d\theta_1}{dt} - R_1 \quad (7)$$

where $J_1$=moment of inertia of the first gear $\Theta_1$=angle of the first gear $\gamma_1$=viscous torque coefficient $R_1$=Coulomb torque friction $F_1$=reaction time from the second gear on the first gear $r_{10}$=distance from the center of the first gear to the motor $r_{12}$=distance from the center of the first gear to the second gear.

The equation of motion (8) of the second gear 14 is:

$$J_2 \frac{d^2\theta_2}{dt^2} = F_1 r_{21} - F_2 r_{2s} - 2\gamma_2 \frac{d\theta_2}{dt} - R_2. \quad (8)$$

The equation of motion (9) of the pickup is:

$$m_s \frac{d^2 x_s}{dt^2} = F_2 - 2\gamma_s \frac{dx_s}{dt} - R_s \quad (9)$$

where $m_s$=mass of the pickup $F_2$=force of the second gear on the pickup $Y_s$=viscous coefficient of the pickup $R_s$=Coulomb friction of the pickup.

Based on the equation (**), the equation of motion (10) of the entire pickup is:

$$m\frac{d^2 x_s}{dt^2} = K_m R_m I_m - 2\gamma\frac{dx_s}{dt} - F_c \quad (10)$$

where m=equivalent mass of pickup/gear/motor system $K_m$=system motor constant

γ=overall viscous coefficient $F_c$=overall Coulomb friction.

These equations (6) to (10), representing the equations of motion of the respective constituent elements, are modified to give a proof.

If the equation (6) is modified into an equation for F0, the following equation (11):

$$F_0 r_{01} = K_0 I_m - J_0 \frac{d^2\theta_0}{dt^2} - 2\gamma_0 \frac{d\theta_0}{dt} - R_0. \tag{11}$$

If the equation (7) is modified into an equation for F1, the following equation (12):

$$F_1 r_{12} = F_0 r_{10} - J_1 \frac{d^2\theta_1}{dt^2} - 2\gamma_1 \frac{d\theta_1}{dt} - R_1 \tag{12}$$

is obtained.

If the equation (8) is modified into an equation for F2, the following equation (13):

$$F_2 r_{2s} = F_1 r_{21} - J_2 \frac{d^2\theta_2}{dt^2} - 2\gamma_2 \frac{d\theta_2}{dt} - R_2 \tag{13}$$

is obtained.

If the equation (11) is substituted into the equation (12), the equation (12) is substituted into the equation (13), the equation (13) is substituted into the equation (11) and the relation with a downstream side gear is expressed using $\theta_i$ for vs, the following equations (14):

$$r_{01}\frac{d\theta_0}{dt} = r_{10}\frac{d\theta_1}{dt} \tag{14}$$

$$r_{12}\frac{d\theta_1}{dt} = r_{21}\frac{d\theta_2}{dt}$$

$$r_{2s}\frac{d\theta_2}{dt} = v_s$$

is obtained.

Also, if the equation (13) is substituted into the equation (9), the following equation (15):

$$m_s \frac{d^2 x_s}{dt^2} = \left(F1\frac{r_{21}}{r_{2s}} - \frac{J_2}{r_{2s}}\frac{d^2\theta_2}{dt^2} - \frac{2\gamma_2}{r_{2s}}\frac{d\theta_2}{dt} - \frac{R_2}{r_{2s}}\right) - 2\gamma_s \frac{dx_s}{dt} - R_s$$

is obtained.

If the equation (12) is substituted into the equation (15), the following equation (16):

$$m_s \frac{d^2 x_s}{dt^2} = \left[\left(F_1 \frac{r_{10}}{r_{212}} - \frac{J_1}{r_{12}}\frac{d^2\theta_1}{dt^2} - \frac{2\gamma_1}{r_{12}}\frac{d\theta_1}{dt} - \frac{R_1}{r_{12}}\right)\frac{r_{21}}{r_{2s}} - \right. \tag{16}$$

$$\left. \frac{2\gamma_2}{r_{2s}}\frac{d^2\theta_2}{dt^2} - \frac{J_2}{r_{2s}}\frac{d^2\theta_2}{dt^2} - \frac{R_2}{r_{2s}}\right] - 2\gamma_s \frac{dx_s}{dt} - R_s$$

is obtained.

If the equation (11) is substituted into the equation (16), the following equation (17):

$$m_s \frac{d^2 x_s}{dt^2} = \left\{\left[\left(\frac{K_0}{r_{01}}I_m - \frac{J_0}{r_{01}}\frac{d^2\theta_0}{dt^2} - \frac{2\gamma_0}{r_{01}}\frac{d\theta_0}{dt} - \frac{R_0}{r_{01}}\right)\frac{r_{10}}{r_{12}} - \right.\right. \tag{17}$$

$$\frac{J_1}{r_{12}}\frac{d^2\theta_1}{dt^2} - \frac{2\gamma_1}{r_{12}}\frac{d\theta_1}{dt} -$$

$$\left.\left.\frac{R_1}{r_{12}}\right]\frac{r_{21}}{r_{2s}} - \frac{J_2}{r_{2s}}\frac{d^2\theta_2}{dt^2} - \frac{2\gamma_2}{r_{2s}}\frac{d\theta_2}{dt} - \frac{R_2}{r_{2s}}\right\} - 2\gamma_s \frac{dx_s}{dt} - R_s$$

is obtained.

If the equation (17) is re-arranged, the following equation (18):

$$m_s \frac{d^2 x_s}{dt^2} + \frac{J_1}{r_{01}}\frac{r_{10}}{r_{12}}\frac{r_{21}}{r_{2s}}\frac{d^2\theta_0}{dt^2} + \frac{J_1}{r_{12}}\frac{r_{21}}{r_{2s}}\frac{d^2\theta_1}{dt^2} + \frac{J_2}{r_{2s}}\frac{d^2\theta_2}{dt^2} = \tag{18}$$

$$\frac{K_0}{r_{01}}\frac{r_{10}}{r_{12}}\frac{r_{12}}{r_{2s}}I_m - \left(\frac{2\gamma_0}{r_{01}}\frac{r_{10}}{r_{12}}\frac{r_{21}}{r_{2s}}\frac{d\theta_0}{dt} + \frac{2\gamma_1}{r_{12}}\frac{r_{21}}{r_{2s}}\frac{d\theta_1}{dt} + \frac{2\gamma_2}{r_{2s}}\frac{d\theta_2}{dt} + 2\lambda_s \frac{dx_s}{dt}\right) -$$

$$\left(\frac{R_0}{r_{01}}\frac{r_{10}}{r_{12}}\frac{r_{21}}{r_{2s}} + \frac{R_1}{r_{12}}\frac{r_{21}}{r_{2s}} + \frac{R_s}{r_{2s}} + R_s\right)$$

is obtained.

If the equation (14) is modified, the following equation (19):

$$\frac{d\theta_2}{dt} = \frac{v_s}{r_{2s}} \tag{19}$$

$$\frac{d\theta_1}{dt} = \frac{r_{21}}{r_{12}}\frac{d\theta_2}{dt} = \frac{r_{21}}{r_{12}}\frac{v_s}{r_{2s}}$$

$$\frac{d\theta_0}{dt} = \frac{r_{10}}{r_{01}}\frac{d\theta_1}{dt} = \frac{r_{10}}{r_{01}}\frac{r_{21}}{r_{12}}\frac{v_s}{r_{2s}}$$

is obtained.

Let $$g_0 = \frac{r_{10}}{r_{01}}\frac{r_{21}}{r_{12}}\frac{1}{r_{2s}} \tag{20}$$

$$g_1 = \frac{r_{21}}{r_{12}}\frac{1}{r_{2s}}$$

$$g_2 = \frac{1}{r_{2s}}$$

Combining the equations (18) to (20), we obtain:

$$m_s\frac{d^2 x_s}{dt^2} + J_0 g_0^2 \frac{d^2 x_s}{dt^2} + J_1 g_1^2 \frac{d^2 x_s}{dt^2} + J_2 g_2^2 \frac{d^2 x_s}{dt^2} = \tag{21}$$

$$K_0 g_0 I_m - \left(2\gamma_0 g_o^2 \frac{dx_s}{dt} + 2\gamma_1 g_1^2 \frac{dx_s}{dt} + 2\gamma_2 g_2^2 \frac{dx_s}{dt} + 2\gamma_s \frac{dx_s}{dt}\right) -$$

$$(R_0 g_0 + R_1 g^1 + R_2 g^2 + R_s)$$

where we have used $$\frac{dx_s}{dt} = v_s. \tag{22}$$

Therefore, the equation (21) can be expressed by the following equation (23):

$$m\frac{d^2 x_s}{dt^2} = K_m R_m I_m - 2\gamma \frac{dx_s}{dt} - F_c \quad (23)$$

where $$m = m_s + J_0 g_0^2 + J_1 g_1^2 + J_2 g_2^2$$

$$\gamma = \gamma_0 g_0^2 + \gamma_1 g_1^2 + \gamma_2 g_2^2 \gamma_s$$

$$F_c = R_0 g_0 + R_1 g_1 + R_2 g_2 R_s \quad (24)$$

and $$K_m R_m = K_0 g_0 \quad (25).$$

If the equation (25) is multiplied by $v_s$, we obtain:

$$K_m R_m v_s = K_0 g_0 v_s \quad (26).$$

From the equations (19) and (20), the following equation (27):

$$g_0 v_s = \frac{d\theta_0}{dt} \quad (27)$$

is derived.

Substituting the equation (26) into the equation (27), we obtain the following equation (28):

$$K_m R_m v_s = K_0 \frac{d\theta_0}{dt}. \quad (28)$$

We now recall the equations (2) and (5):

$$E_b = K_1 \omega_m \quad (2)$$

and $$K_0 = K_1 \quad (5).$$

On the other hand, $\omega_m$ may be expressed by:

$$\omega_m = \frac{d\theta_0}{dt}. \quad (29)$$

Combining the equations (2), (5) and (29) into the equation (28), we obtain:

$$E_b = K_m R_m v_s \quad (*).$$

The above is the proof of the equation (*) used to find the motor constant $K_m$.

A parameter measurement device of a sled mechanism, according to a second embodiment of the present invention, is now explained. In the following description of the second embodiment, the sled mechanism to be measured is the same as that of the above-described first embodiment and hence the same reference numerals are used to depict the same components to omit the corresponding explanation.

In the parameter measurement device of the sled mechanism of the second embodiment, the viscous coefficient $\gamma$ and the Coulomb coefficient $F_c$ of the sled mechanism configured for causing movement of the optical pickup radially of the optical disc are measured.

Figure 3:
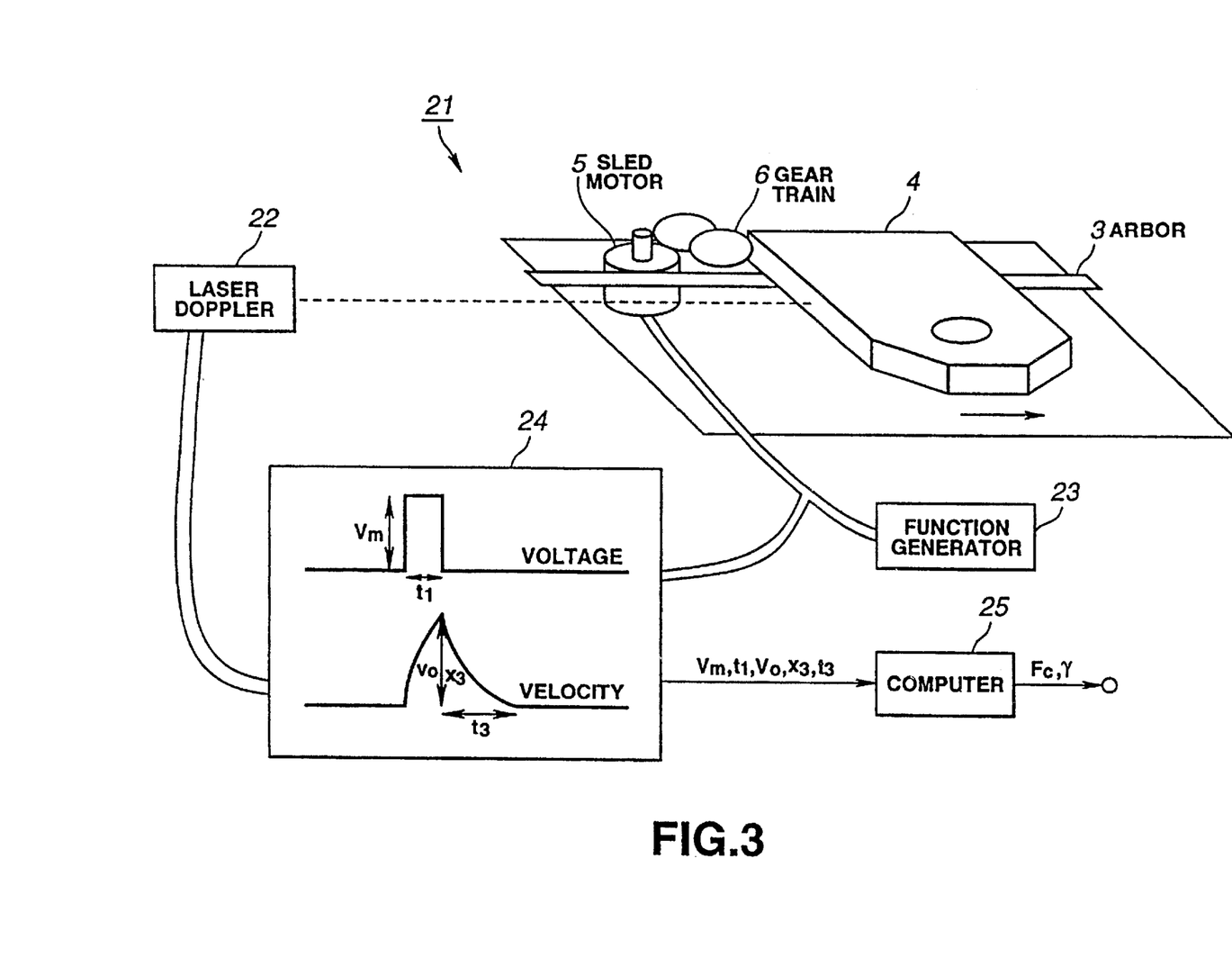
FIG. 3 shows a device for measuring parameters of a sled mechanism according to a first embodiment of the present invention.

FIG. 3 shows a configuration of the parameter measurement device of the sled mechanism according to the second embodiment of the present invention.

A parameter measurement device 21 for measuring parameters of the sled mechanism 2 includes a laser Doppler meter 22, for detecting the linear movement velocity of the pickup 4, a function generator 23 for supplying a pre-set rectangular electrical voltage to the sled motor 5, an oscilloscope 24 for detecting the movement velocity as detected by the laser Doppler meter 22 and the rectangular electrical voltage generated by the function generator 23, and a computer 25 for calculating the viscous coefficient $\gamma$ and the Coulomb coefficient $F_c$ based on the results detected by the oscilloscope.

The parameter measurement device 21 of the sled mechanism measures the viscous coefficient $\gamma$ and the Coulomb coefficient Fc in the following manner.

First, the motor constant $K_m$ is measured. This motor constant Km is measured by the parameter measurement device 1 of the sled mechanism shown in the above-described first embodiment. If the parameter measurement device 21 of the sled mechanism of the present second embodiment is to be used, measurement similar to that performed in the first embodiment can be made with the function of the function generator 23 turned off A pre-set rectangular electrical voltage then is applied from the function generator 23 to the sled motor 5. Simultaneously, the movement velocity of the pickup 4 and the waveform of the rectangular electrical voltage are detected by the oscilloscope 24. The detection items for detection by the oscilloscope are as follows:

Voltage value $V_m$ of the rectangular electrical voltage;

application time duration $t_1$ of the rectangular electrical voltage;

maximum velocity $v_0$ of the pickup 5;

deceleration time $t_3$ of the pickup 5; and distance $x_3$ traversed by the pickup 5 during its deceleration.

Meanwhile, the deceleration tune $t_3$ of the pickup 5 is the time which elapses since the pickup 5 has acquired the maximum velocity until its velocity is reduced to zero. On the other hand, the distance $x_3$ traversed by the pickup 5 during its deceleration is the distance traversed by the pickup 5 since the time it has acquired the maximum velocity until its velocity is reduced to zero.

Then, based on $V_m$, $t_1$, $v_0$, $t_3$, $x_3$ and $K_m$, as measured, the computer 25 computes the viscous coefficient $\gamma$ and the Coulomb coefficient $F_c$.

Specifically, the computer 25 finds the viscous coefficient $\gamma$ and the Coulomb coefficient Fc by the following steps 1 to 4. It is noted that the equations referred to in the respective steps are those used subsequently for proving.

(Step 1)

The respective values, found by measurement, are substituted into the following equations (37)' and (38)':

$$F'_c = 2\gamma' v_0 / [\exp(-2\gamma' t_3) - 1] \quad (37)'$$

$$F'_c = (v_0 - 2x_3 \gamma') / t_3 \quad (38)'$$

which are then solved to find F'(c) and $\gamma'$.

(Step 2)

The respective values, found on measurement, and the motor constant $K_m$, are substituted into the following equation (44):

$$K'_m = (v_0/t_1 + F'_c + \gamma' v_o)/(V_m - K_m R_m v0/2) \quad (44)$$

to find K'm.

(Step 3)

The motor constant Km and the value of $K'_m$ found at step 2 are substituted into the following equation (46):

$$m = K_m / K'_m \quad (46)$$

to find the mass m of the entire sled mechanism.

(Step 4)

The values of $F'_c$ and $\gamma'$, found at step 1, and the value of m, found at step S3, are substituted into the following equation (43):

$$F'_c = F_c/m$$
$$\gamma = \gamma'/m \quad (43)$$

to find the viscous coefficient $\gamma$ and the Coulomb coefficient Fc.

With the parameter measurement device 21 of the sled mechanism, as described above, it is possible to find the viscous coefficient $\gamma$ and the Coulomb coefficient Fc in the sled mechanism of the optical disc drive. Thus, the viscous coefficient $\gamma$ and the Coulomb coefficient Fc can now be reflected in the pickup simulation.

The above equations, used to find the viscous coefficient $\gamma$ and the Coulomb coefficient Fc, are now proved.

We now recall the equation (23):

$$m\frac{d^2 x_s}{dt^2} = K_m R_m I_m - 2\gamma \frac{dx_s}{dt} - F_c \quad (23)$$

It is assumed that the parameter measurement device 21 of the sled mechanism of the present second embodiment performs measurement under the following conditions: condition (a): The rectangular pulsed voltage is supplied to the sled motor 5; and condition (b): The rise time (L/R) of the coil of the sled motor 5 is shorter than the deceleration time of the pickup 5 following the supply of the rectangular pulse.

It is noted that the above-mentioned condition (b) holds for the routine optical disc system because the sled motor coil current $I_m$ abruptly is reduce to zero after the rectangular pulse is supplied. Therefore, by applying the conditions (a) and (b) to the above equation (23), the following equation (30):

$$m\frac{d_2 x_s}{dt^2} = -2\gamma \frac{dx_s}{dt} - F_c \quad (30)$$

is derived.

First, this equation (30) is proved.

This equation (30) is modified to the following equation (31):

$$m\frac{d_2 x_s}{dt^2} + 2\gamma \frac{dx_s}{dt} = -F_c. \quad (30)$$

From the above equation (31), the sled position (movement position of the pickup) $x_s$ and the sled velocity (velocity of the pickup 4) are given by the following equations (32) and (33):

$$x_s = A\exp(-2\gamma t/m) + B - F_c t/2\gamma \quad (32)$$
$$v_s = -2\gamma A/m \exp(-2\gamma t/m) - F_c/2\gamma \quad (33)$$

For the peak velocity $v_0$, deceleration time $t_3$ and the deceleration distance $x_3$ of the pickup 4, measured results by the laser Doppler meter 7 and the oscilloscope 8 are used.

First, at time t=0, the sled velocity $v_s=v_0$. Substituting these into the equation (33), we obtain the following equation (34):

$$v_0 = -2\gamma A/m - F_c/2\gamma$$
$$A = (-v_0 F_c/2\gamma \quad (34)$$

Substituting this equation (34) into the equation (33), we obtain the following equation (35):

$$v_s = (v_0 + F_c/2\gamma)\exp(-2\gamma t/m) - F_c/2\gamma \quad (35)$$

If time t=0, the sled velocity vs=v0. Substituting these into the equation (33), we obtain the following equation (34):

$$v_0 = 2\gamma A/m - F_c/2\gamma$$
$$A = (-v_0 - F_c/2\gamma)m/2\gamma \quad (34)$$

Substituting the equation (34) into the equation (33), we obtain:

$$v_s = (v_0 + F_c/2\gamma)\exp(-2\gamma t/m) - F_c/2\gamma \quad (35)$$

If time $t=t_3$, the sled velocity $v_s=0$. Substituting these into the equation (35), we obtain the following equation (36):

$$0 = (v_0 + F_c/2\gamma)\exp(-2\gamma t_3/m) - F_c/2\gamma \quad (36)$$

Solving this equation (36) for Fc, we obtain:

$$F_c = 2\gamma v_0/[\exp(-2\gamma t_3/m) - 1] \quad (37)$$

If time t=0, the sled position $x_s=0$. Substituting these into the equation (32), and combining with the equation (34), we obtain the following equation (38):

$$0 = A + B$$
$$B = -A + (v_0 + F_c/2\gamma)m/2\gamma \quad (38)$$

Therefore, the equation (32) becomes $$X_s = A[\exp(-2\gamma t/m - 1] - F_c t/2\gamma$$
$$= (v_0 + F_c/2\gamma)m/2\gamma[1 - \exp(-2\gamma t_3/m)] - Fc\ t_3/2\gamma$$
$$x_3 = (v_0 + F_c/2\gamma)m/2\gamma[1 - \exp(-2\gamma t_3/m)] - Fc t_3/2\gamma \quad (39)$$

From the equation (36), the following equation (40):

$$\exp(-2\gamma t_3/m) = F_c/2\gamma/(v_0 + F_c/2\gamma) \quad (40)$$

is derived.

Substituting this equation (40) into the equation (39), we obtain the following formula (41):
$$x_3 = (v_0 + F_c/2\gamma)m/2\gamma[1 - F_c/2\gamma/(v_0 + F_c/2\gamma)] - Fc t_3/2\gamma$$
$$= m/2\gamma[(v_0 + Fc/265) - Fc/2\gamma] - F_c t_3/2\gamma$$
$$= mv_0/2\gamma - F_c t_3/2\gamma \quad (41)$$

From this equation (41), we obtain:

$$F_c = (mv_0 - 2x_3\gamma)/t_3 \quad (42)$$

The equations (37) and (42), derived as described above, are required to determine $\gamma$ and Fc.

These equations (37) and (42) are modified into equations devoid of the mass m of the entire sled mechanism. Thus, we obtain the following equations (37)' and (42)':

$$F'_c = 2\gamma' v_0/[\exp(-2\gamma' t_3) - 1] \quad (37)'$$
$$F'_c = (v_0 - 2x_3\gamma)/t_3 \quad (42)$$

where $F'_c$ and $\gamma'$ are as shown in the following equation (43):

$$F'_c = F_c/m$$
$$\gamma' = \gamma/m \quad (43)$$

Therefore, by finding the mass in of the entire sled mechanism, the viscosity coefficient γ and the Coulomb friction $F_c$ can be found by the above equations (37)' and (42)'.

The mass m of the entire sled mechanism is now explained.

We again recall the equation (23):

$$m\frac{d^2 x_s}{dt^2} = K_m R_m I_m - 2\gamma \frac{dx_s}{dt} - F_c. \qquad (23)$$

It is assumed that the parameter measurement device 21 of the sled mechanism of the second embodiment performs measurements under the following condition(c): condition (c)

By supplying the rectangular pulsed voltage, acceleration of the pickup 4 is changed relatively linearly.

The reason is that the rise time (L/R) of the coil of the sled motor 5 is rather short such that $V_m = R_m I_m - E_b$, where $E_b = K_m R_m v_s$ from the above equation (*), with the average value being $K_m R_m v_0/2$.

If this average value and the rectangular voltage applying time $t_1$ are substituted into the equation (23), we obtain:

$$m(v_0/t_1) = K_m(V_m - K_m R_m v_0 2) - 2\gamma(v_0/2) - F_c$$

where $v_0/t_1$ = average acceleration and
$v_0/2$ = average velocity.

Accordingly, the following equation (44):

$$K'_m = (v_0/t_1 + F'_c + \gamma' v_0)/(V_m - K_m R_m v_0/2) \qquad (44)$$

where $$K'_m = K_m/m \qquad (45)$$

is derived.

$K'_m$ can be found from the back-electromotive force $E_b$, as indicated in the above-described first embodiment. From this, the mass m of the sled mechanism in its entirety can be found by the following equation (46):

$$m = K_m/K'_m \qquad (46).$$

By substituting the equation (46) into the equations (37)' and (42)', the viscosity coefficient γ and the Coulomb friction Fc can be derived.

What is claimed is:

1. A parameter measurement device for a sled mechanism of an optical disc drive comprising:
   means for detecting the back-electromotive force of a sled motor;
   means for detecting the movement velocity of an optical pickup;
   means for causing movement of the optical pickup; and
   means for calculating a motor constant of the sled mechanism based on the back-electromotive force of the sled motor and on the movement velocity of the optical pickup when the movement means causes the movement of the optical pickup;
   whereby detecting the movement velocity of the optical pickup includes performing a Doppler measurement.

2. The parameter measurement device for a sled mechanism according to claim 1 wherein the calculating means finds the motor constant Km based on $E_b = K_m R_m v_0$, where $E_b$ is the back-electromotive force of the sled motor when the movement means causes the movement of the optical pickup, $v_0$ is the movement velocity of the optical pickup when the movement means causes the movement of the optical pickup and Rm is the resistance of the sled motor.

3. A parameter measurement device for a sled mechanism of an optical disc drive comprising:
   means for supplying a rectangular electrical voltage of a voltage magnitude Vm and the time t1 to a sled motor;
   means for detecting the maximum velocity $v_0$ of the pickup when the rectangular electrical voltage is supplied to the sled motor, the deceleration time $t_3$ of the optical pickup, and the distance $x_3$ traversed by the optical pickup during deceleration thereof; and
   means for calculating the viscous coefficient and/or the Coulomb coefficient of the sled mechanism of the optical disc drive based on the voltage magnitude $V_m$, the above time $t_1$, maximum velocity of the pickup $v_0$, deceleration time $t_3$ of the optical pickup, the distance $x_3$ traversed by the optical pickup during deceleration thereof and the motor constant Km.

4. The parameter measurement device for the sled mechanism according to claim 3 wherein
   γ' and F'c are found using $$F'c = 2\gamma' v_0[\exp(-2\gamma' t_3) - 1] \qquad (A)$$

and $$F'c = (v_0 - 2x_3\gamma')/t_3 \qquad (B)$$

the mass m of the sled mechanism in its entirety is found using $$m = K_m/[(v_0/t_1 + F'_c + \gamma' v_0)/(V_m + K_m R_m v_0/2)] \qquad (C)$$

and wherein the mass m, γ' and F'c thus found are substituted into $$Fc = mF'c \qquad (D)$$

and $$\gamma = m\gamma' \qquad (E)$$

to find the viscosity coefficient γ and the Coulomb friction Fc.

5. A method for detecting parameters in a sled mechanism of an optical disc drive comprising:
   causing movement of an optical pickup;
   detecting the back-electromotive force of a sled motor and the movement velocity of the optical pickup on causing movement of the optical pickup; and
   finding the motor constant of the sled mechanism based on the detected back-electromotive force of the sled motor and the detected movement velocity of the optical pickup;
   whereby detecting the movement velocity of the optical pickup includes performing a Doppler measurement.

6. The method according to claim 5 wherein the motor constant $K_m$ of a sled motor is found based on $E_b = K_m R_m v_0$, where $E_b$ is the back-electromotive force of the led motor on causing movement of the optical pickup, $v_0$ is the movement velocity of the optical pickup on causing movement of the optical pickup, and Rm is the resistance of the sled motor.

7. A method for detecting parameters in a sled mechanism of an optical disc drive comprising the steps of:
   supplying a rectangular electrical voltage of a voltage magnitude $V_m$ and the time $t_1$ to a sled motor;

detecting the maximum velocity $v_0$ of the pickup when the rectangular electrical voltage is supplied to the sled motor, the deceleration time $t_3$ of the optical pickup, and the distance $x_3$ traversed by the optical pickup during deceleration thereof; and calculating the viscous coefficient and/or the Coulomb coefficient of the sled mechanism based on the voltage magnitude $V_m$, the above time $t_1$, maximum velocity of the pickup $v_0$, deceleration time $t_3$ of the optical pickup, the distance $x_3$ traversed by the optical pickup during deceleration thereof and the motor constant $K_m$.

8. The method according to claim 7 wherein

γ' and F'c are found using $$F'_c = 2\gamma' v_0 / [\exp(-2\gamma' t_3) - 1] \qquad (A)$$

and $$F'c = (v_0 - 2x_3 \gamma') / t_3 \qquad (B)$$

the mass m of the sled mechanism in its entirety is found using $$m = K_m / [(v_0/t_1 + F'c + \gamma' v_0)/(V_m - K_m R_m v_0/2)] \qquad (C)$$

and wherein the mass m, γ' and F'c thus found are substituted into $$Fc = mF'c \qquad (D)$$

and $$\gamma = m\gamma' \qquad (E)$$

to find the viscosity coefficient γ and the Coulomb friction Fc.

9. A parameter measurement device for a sled mechanism of an optical disc drive comprising:

means for detecting the back-electromotive force of a sled motor;

means for detecting the movement velocity of an optical pickup;

means for causing movement of the optical pickup; and means for calculating a motor constant $K_m$ of the sled mechanism based on $E_b = K_m R_m v_0$, where $E_b$ is the back-electromotive force of the sled motor when the means for causing movement causes the movement of the optical pickup, $v_0$ is the movement velocity of the optical pickup when the means for causing movement causes the movement of the optical pickup and Rm is the resistance of the sled motor.

10. A method for detecting parameters in a sled mechanism of an optical disc drive comprising:

causing movement of an optical pickup;

detecting the back-electromotive force of a sled motor and the movement velocity of the optical pickup on causing movement of the optical pickup; and finding the motor constant $K_m$ of the sled mechanism based on $E_b = K_m R_m v_0$, where $E_b$ is the back-electromotive force of the sled motor on causing movement of the optical pickup, $v_0$ is the movement velocity of the optical pickup on causing movement of the optical pickup, and Rm is the resistance of the sled motor.

* * * * *